QUICK-ACTING, STABLE, NEUTRAL SOLUTION OF BOVINE INSULIN AND PROCESS FOR THE PRODUCTION THEREOF

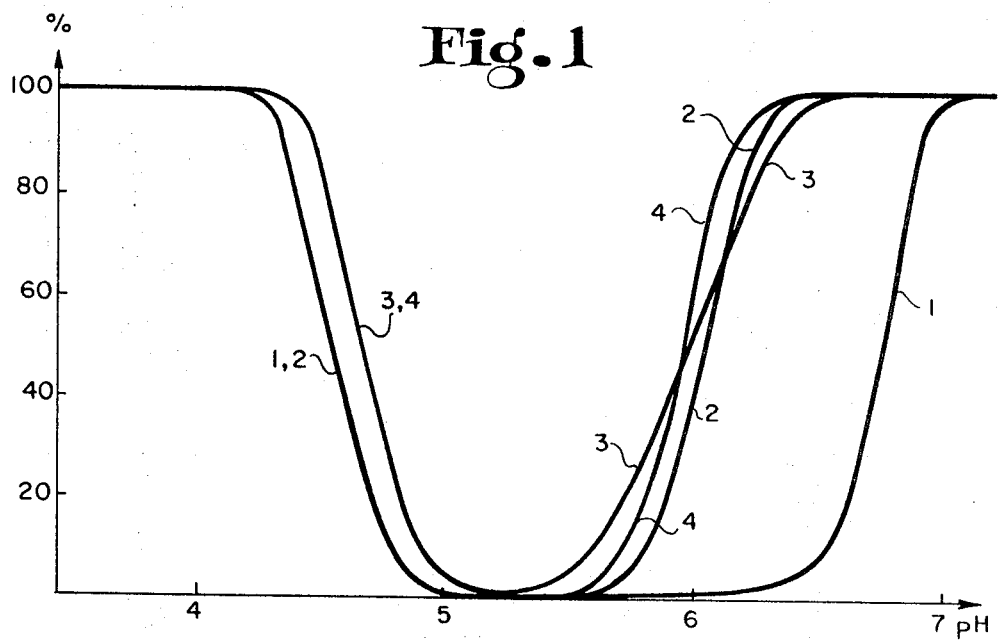
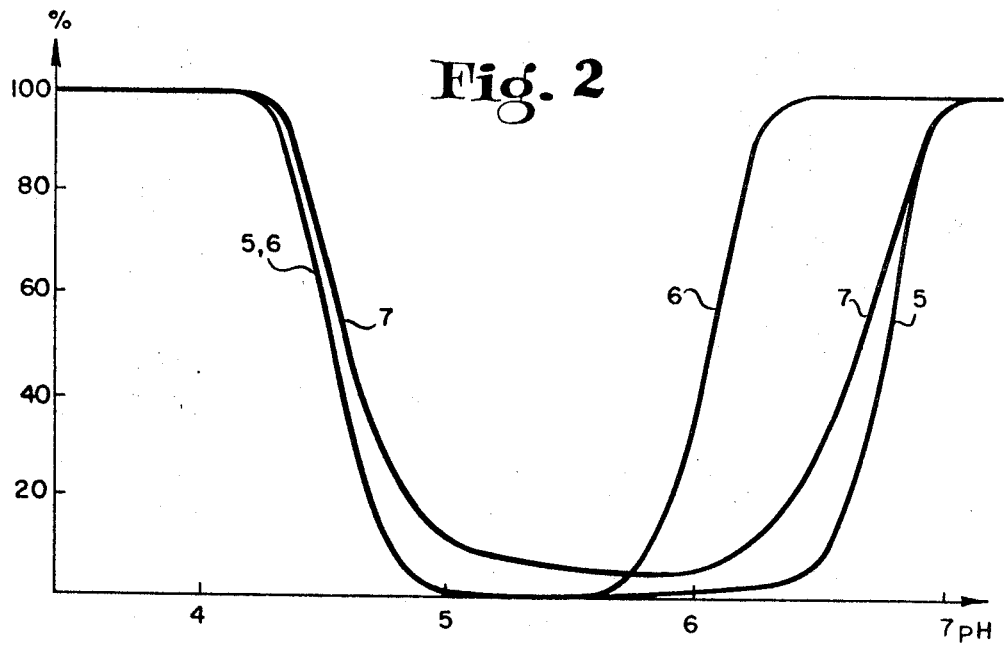
INVENTORS
CHARLES H. KRAYENBÜHL
METTE SCHOU 3,584,121

Charles H. Krayenbühl, Hellerup, and Mette Schou, Lyngby, Denmark, assignors to Nordisk Insulinlaboratorium, Gentofte, Denmark
Filed Feb. 28, 1968, Ser. No. 708,942
Claims priority, application Denmark, Mar. 1, 1967, 1,075/67
Int. Cl. A61k 17/02
U.S. Cl. 424—178                                                6 Claims

ABSTRACT OF THE DISCLOSURE

A stable, neutral solution (pH 6.5–8) of bovine insulin having a quick-acting blood-sugar lowering effect. The solution may also contain insulin of other types (origin) or long-acting insulin material. Bovine insulin, which tends to precipitate at neutral pH values, is retained in solution by the copresence of from 0.15% to 0.5% (w./v.) of phenol or cresol and of zinc in the amount of from 0.3 to 0.8% by weight of the insulin. Sodium chloride and similar electrolytes are excluded, and the solution is made isotonic with glycerol or glucose or other carbohydrates which are not electrolytically dissociated in aqueous solution. However, a phosphate buffer, especially sodium phosphate is permissible and desirable, and increases the solubility of the bovine insulin.

---

The present invention relates to a quick-acting and stable neutral solution of bovine insulin and to a process for producing such soltuions for use in insulin therapy in man.

Compared with solutions of ordinary insulin, which have a pH-value of 3–4, a quick-acting, stable, neutral solution of insulin presents certain therapeutic advantages, in that its initial effect starts a litle sooner, which in some cases has been assumed to be of clinical value, and in that it is capable of being more widely used for the purpose of admixture with insulin suspensions or compounds having a pH near the neutral point and having a retarded or prolonged action when injected. In such mixtures the neutral solution provides a quickly initiated action while the suspended insulins or insulin compound provides a slow and prolonged action. Furthermore, neutral dissolved insulin is better suited for intravenous application than is acid, dissolved insulin. Here and in the following, when nothing else is stated, the term neutral means pH-value betwen 6.5 and 8.

Stable, neutral insulin solutions with quickly initiating effect have hitherto been produced in the form of solutions of pig insulin, which is due to several reasons. Thus, in some locations as for instance in Denmark, pig insulin is available in great amounts. It has furthermore been generally assumed that, in contradistinction to what is the case with insulin produced from the pancreas of oxen and calves (in the following referred to as bovine insulin), the upper isoelectric precipitation limit for pig insulin is sufficiently below the pH of the blood to ensure that no precipitation of insulin will take place in a solution at the pH of blood when such a solution is allowed to stand and even if slight variations in reaction should occur. This assumption has been supported by the fact that it is possible to produce from bovine insulin suspensions of insulin of neutral reaction from which the insulin is slowly resoluble.

On the other hand it would be desirable if bovine insulin could be made use of as a constituent in a neutral solution of insulin, because inter alia, bovine insulin is produced in considerably higher amounts than is pig insulin.

The present invention aims at meeting this demand for utilization of said raw material, i.e. bovine insulin.

The idea on which the present invention is based is that it might be possible to compensate for the property of bovine insulin which is undesirable for the present purpose, namely that under certain conditions it is substantially less soluble than is pig insulin, by giving the agent used for dissolving bovine insulin or mixtures thereof with insulin of other origin a particular composition adapted for the purpose and providing that the bovine insulin has a purity adapted for the purpose. Allowance should be made for the bovine insulin containing at the same time the amount of zinc necesary for crystallization. The invention has for its purpose not only a solution of such composition but also a process of producing the solution whereby this purpose is attained.

The solution according to the invention is characterised in that the stable, aqueous, neutral, injectable solution of insulin contains as blood sugar lowering agent bovine insulin alone or in mixture with insulin of other origin and that it contains as a preservative an aromatic solubility-promoting agent belonging to the phenol group at a concentration in which it has a solubility-promoting effect within the pH-range in question.

In accordance with this invention, it has been found that with the presence of a given amount of the said preserving agent together with zinc in the amount necessary for the crystallization of insulin it is possible to lower the precipitation zone of the bovine insulin to a pH-value below 6.5 and to give the solution a complete physical stability extending over long periods.

It is surprising that said preserving agents have this effect since hitherto they have only been known as having the opposite effect, i.e. to promote the crystallization tendency of certain insulin compounds such as protamine insulin and zinc-protamine insulin. It has even been stated that the preservatives in question may promote the crystallization of uncombined insulin with at least certain ranges of the zinc content of the insulin. Moreover it has been found that certain other preserving agents, which are commonly used in insulin solutions such as methyl- or ethylhydroxybenzoate, do not have this effect, but on the contrary reduce the solubility of bovine insulin at pH-values above the upper limit of the isoelectric precipitation range.

It has been found that the presence of sodium chloride and similar electrolytes which are highly dissociated in aqueous medium greatly reduce the stability of the solution when they are present in a concentration isotonic with tissue liquid. Their presence must therefore be avoided. To allow this, the invention provides for using as agent for making the solution isotonic with blood and tissue liquid glycerol or glucose or similar carbohydrates or isomeric derivatives thereof which are not electrolytically dissociated in aqueous solution. It has been found that, peculiar as it may seem content of phosphate buffer, especially sodium phosphate, in the solution increases the solubility of bovine insulin when the solution is of the kind above described, and under the conditions stated above and using the concentrations conventionally applied, the phosphate contrary to certain other buffers increases the stability of the solution and also further increases the stability of the bovine insulin. A preferred solution embodying the present invention thus desirably contains sodium phosphate as buffer. In addition to the said increase of the stability of the solution, a good buffer effect is also obtained.

The concentration of the phenol compound may, in the case of phenol or m-cresol most advantageously be within the range 0.15% to about 0.5% w./v. which is equivalent to 1.5 to 5 grams per liter of solution.

It has further been found that if the insulin has a very low content of zinc, the desired solubility is only scarcely obtained in cases where the pH-value is within the range 6.5–7. In such cases accordingly in connection with insulin having a low metal content it is preferable to use solutions having a pH-value between 7 and 8.

A particularly advantageous solution according to the invention contains, in connection with phosphate buffer and phenol or m-cresol, a total of 0.3–0.8% zinc calculated on the weight of insulin.

The method forming the subject matter of the invention is characterised in that bovine insulin is dissolved together with an aromatic solubility-promoting substance belonging to the phenol group at a proportion within the range of concentration in which these compounds promote the solubility of the insulin at a neutral pH range, and that further constituents suitable for obtaining an injectable solution of insulin and if so desired insulin of other origin are included in the solution.

The advantages obtained hereby appear from what has been said above in connection with the discussion of the solutions.

In connection with the process according to the invention it is furthermore possible to use additions of the other above-named components in amounts which are within the abovenamed limits and for the purposes there indicated.

In the following the invention will be more closely described with reference to the drawing showing some solubility curves and with reference to a number of examples.

In the drawing:

FIG. 1 shows a comparison between solubility curves, using bovine insulin and pig insulin, with and without contents of m-cresol, and FIG. 2 shows a comparison between solubility curves relating to the same bovine insulin with and without the presence of different preserving agents.

In FIGS. 1 and 2 the abscissas indicate the pH-value of the solution and the ordinate indicate how many percent of the total insulin are present at the pH in question in the dissolved state after standing for 24 hours at 20° C. In both figures the solutions contain the insulin in question in a concentration of 40 international uits (IE) per milliliter. In both cases the medium contains M/75 phosphate buffer and as agent for the obtaining of isotony with the body liquid 1.6% w./v. of glycerol. The insulin is crystalline insulin containing 0.7% of zinc.

In FIG. 1, the curves 1 and 2 refer to bovine insulin, the curves 3 and 4 to pig insulin. In the curves 1 and 3 the solution contains no preserving agent, whereas curve 2 and 4 represent the behaviour of insulin solutions containing 0.3% w./v. of m-cresol.

When comparing the curves it will be seen that bovine insulin, when no preserving agent is present, has a very broad precipitation range, and that, with the above indicated composition, it is not possible to obtain a clear solution at pH-values lower than 7.1. It is our experience that this does not offer sufficient certainty with regard to avoiding the occurrence of precipitation under normal storage conditions of a neutral bovine insulin solution. In comparison thereto, pig insulin and bovine insulin both have a considerably lower or narrower precipitation range when m-cresol is present. In the case of bovine insulin the effect of the addition of said preserving agent is quite striking and decisive for achieving the purpose in view, while the effect in the case of pig insulin is rather inconsiderable. However, it appears clearly that the solubility of the pig insulin does not become less on addition of cresol under the conditions stated, from which it can be concluded that the solution may very well contain a mixture of bovine insulin and pig insulin and in some cases also other insulin types, if so desired, without altering the effect.

In FIG. 2 the curves 5, 6 and 7 show the solubility of bovine insulin without addition of a preserving agent, with addition of 0.3% w./v. of m-cresol and with addition of 0.1% w./v. of the well known preserving agent methyl-p-hydroxybenzoate respectively. The curves demonstrate that the addition of methyl-p-hydroxybenzoate, which is not a phenol compound, is quite unsuitable for the purpose in question, but otherwise, as will be seen from the curves 5 and 6, confirm the fact already demonstrated by the curves 1 and 2 of FIG. 1, i.e. that the addition of the phenol compound m-cresol promotes the solubility of bovine insulin in a striking degree suitable for fulfilling the purpose of the invention.

In the following examples a number of embodiments of the invention is described, the process proper as well as the starting materials and the resulting components in the solution varying within the limits of the invention.

EXAMPLE 1

Crystalline bovine insulin corresponding to 80.000 IE containing 0.5% w./v. of Zn is dissolved in 300 mls. of water containing 4 mls. of 1 N HCl. To this there is added 500 mls. of a solution of 3 g. of m-cresol and 16 g. of glycerol and 200 mls. of an M/15 solution of sodium phosphate buffer (pH 7.75). If necessary the solution is adjusted with 1 N NaOH or 1 N HCl to pH 7.00–7.20 and is then subjected to sterilisation filtration.

EXAMPLE 2

Crystalline bovine insulin corresponding to 40,000 IE containing 0.1% of Zn is dissolved in 300 mls. of water containing 2 mls. of 1 N HCl. Hereto is added 500 mls. of of a solution of 3 g. m-cresol and 50 g. of glucose and 200 mls. of an M/15 solution of sodium phosphate buffer (pH 7.00). If necessary the solution is thereupon adjusted to pH 6.75–6.95 by means of 1 N NaOH or 1 N HCl and subjected to sterilisation filtration.

EXAMPLE 3

Amorphous bovine insulin corresponding to 40.000 IE containing 0.1% of Zn is dissolved in 300 mls. of water containing 2 mls. of 1 N HCl. Hereto is added 500 mls. of a solution of 2.5 g. of phenol and 16 g. of glycerol and 200 mls. of an M/15 solution of a sodium phosphate buffer (pH 7.90). If necessary the solution is thereupon adjusted to pH 7.30–7.50 by means of 1 N NaOH or 1 N HCl and subjected to sterilisation filtration.

EXAMPLE 4

Crystalline bovine insulin corresponding to 40.000 IE containing 0.5% of Zn is dissolved in 300 mls. of water containing 2 mls. of 1 N HCl. Hereto is added 500 mls. of a solution of 2.5 g. of phenol and 16 g. of glycerol and 200 mls. of an M/15 solution of sodium phosphate buffer (pH 7.30). If necessary the solution is thereupon adjusted to pH 7.10–7.30 by means of 1 N NaOH or 1 N HCl and subjected to sterilisation filtration.

EXAMPLE 5

Amorphous bovine insulin corresponding to 40.000 IE containing 0.7% of Zn is dissolved in 300 mls. of water containing 0.6 ml. of 1 N NaOH. Hereto is added 500 mls. of a solution of 3 g. m-cresol and 16 g. of glycerol and 200 mls. of a 0.05 M solution of a sodium acetate buffer of pH 7.50. Thereupon the solution is adjusted, if necessary with 1 N HCl or 1 N NaOH to pH 7.50–7.70, and subjected to sterilisation filtration.

EXAMPLE 6

Crystalline bovine insulin corresponding to 40.000 IE containing 1% of Zn is dissolved in 300 mls. of water containing 2 mls. of 1 N HCl. To this is added 500 mls. of a solution of 3 g. of m-cresol and 16 g. of glycerol, 200 mls. of a 0.05 M solution of sodium citrate and about 2.4 mls. of 1 N NaOH to pH 7.40–7.60, whereupon it is subjected to sterilisation filtration.

EXAMPLE 7

Amorphous bovine insulin corresponding to 40.000 IE containing 0.5% of Zn is dissolved in 300 mls. of water containing 0.4 ml. 1 N NaOH. To this is added 500 mls. of a solution of 3 g. of m-cresol and 16 g. of glycerol and 200 mls. of an M/15 solution of sodium phosphate (pH 6.75). The solution is thereupon adjusted, if necessary with 1 N NaOH or 1 N HCl to pH 6.90–7.10, and subjected to sterilisation filtration.

EXAMPLE 8

Amorphous bovine insulin corresponding to 40.000 IE containing 0.5% of Zn is dissolved in 200 mls. of an M/15 solution of sec. sodium-phosphate (pH 8.73). To this is added 500 mls. of a solution of 3 g. of m-cresol and 16 g. of glycerol and water containing 6.6 mls. of 1 N HCl to a complete volume of 1000 mls. Thereupon the solution is adjusted, if necessary, with 1 N NaOH or 1 N HCl to a pH 6.90–7.10, and subjected to sterilisation filtration.

EXAMPLE 9

Crystalline bovine insulin corresponding to 40.000 IE containing 0.5% of Zn is dissolved in 300 mls. of water containing 10 mls. of 2 M $H_3PO_4$. To this is added 500 mls. of a solution of 3 g. of m-cresol and 16 g. of glycerol. The solution is combined with about 30.4 mls. of 1 N NaOH with pH 6.90, whereupon it is diluted to make 1000 mls. of solution (pH 6.90–7.10), and subjected to sterilisation filtration.

EXAMPLE 10

Crystalline pig insulin corresponding to 40.000 IE containing 0.5% of Zn is dissolved in 300 mls. of water containing 10 mls. 2 M $H_3PO_4$. To this is added 500 mls. of a solution of 3 g. of m-cresol and 16 g. of glycerol. The solution is combined with about 30.4 mls. of 1 N NaOH at pH 6.90, whereupon it is diluted to make 1000 mls. of solution (pH 6.90–7.10), and is subjected to sterilisation filtration.

EXAMPLE 11

Crystalline insulin (50% pig insulin and 50% bovine insulin) corresponding to 40.000 IE containing 0.5% of Zn is dissolved in 300 mls. of water containing 10 mls. of 2 M $H_3PO_4$. To this is added 500 mls. of a solution of 3 g. of m-cresol and 16 g. of glycerol. The solution then gets an addition of about 30.4 mls. of 1 N NaOH to pH 6.90, whereupon it is diluted to 1000 mls. of solution (pH 6.90–7.10), and subjected to sterilisation filtration.

All of the foregoing examples, except Example 10, yield a stable neutral solution of bovine insulin, useful as such or in suitable dilution for injection to produce a quick-acting blood-sugar lowering effect. Example 10 yields a solution of pig insulin, which solution has similar characteristics and is well suited for mixing with ready-made solutions of bovine insulin composed as above described. When such solutions or those containing bovine insulin and no pig insulin are mixed with other insulin compositions such as suspensions or compounds having a prolonged blood-sugar lowering effect, the neutral bovine insulin solution or mixture serves to provide a quick-acting effect to supplement the prolonged effect of the longeracting composition.

In the foregoing examples, instead of using phenol itself or m-cresol as the solubility-promoting agent, other compounds of the phenol group may be used which are nontoxic in the concentrations used and which increase the solubility of the bovine insulin over that in the same solution without the phenol-group compound. The term phenol group is meant to include phenol and various substituted phenols, such as the cresols and other lower aliphatic hydrocarbon substituted phenols.

We claim:
1. An injectable, quick-acting, neutral aqueous solution of bovine insulin, containing 20 to 80 international units per milliliter of bovine insulin in stable solution at a pH in the range of pH 6.5 to pH 8, containing 0.1% to 1.0% of zinc by weight of the insulin and having a pH in the range of pH 7 to pH 8 when the amount of zinc is very low, and containing 1.5 to 5 grams per liter of a solubility-promoting agent of the class consisting of phenol and cresol, the insulin thereby having greater solubility in such solution than in a like solution without the solubility-promoting agent.

2. An insulin solution as set forth in claim 1 which contains sodium phosphate as a buffer.

3. An insulin solution as set forth in claim 1 which contains 0.3% to 0.8% of zinc by weight of the insulin.

4. An insulin solution as set forth in claim 3 which contains sodium phosphate as a buffer.

5. An insulin solution as set forth in claim 1 which also contains glycerol or glucose in an amount sufficient to make the solution substantially isotonic.

6. An insulin solution as set forth in claim 4 which also contains glycerol or glucose in an amount sufficient to make the solution substantially isotonic.

References Cited

UNITED STATES PATENTS

| | | | |
|---|---|---|---|
| 3,014,842 | 12/1961 | Schlichtkrull | 424—178 |
| 3,060,093 | 10/1962 | Poulsen et al. | 424—178 |
| 3,091,573 | 5/1963 | Schlichtkrull | 424—178 |

ALBERT T. MEYERS, Primary Examiner

F. E. WADDELL, Assistant Examiner